C. R. KIEFER.
BICYCLE.
APPLICATION FILED APR. 11, 1914.

1,109,424.

Patented Sept. 1, 1914.

Inventor
C. R. Kiefer,

Witnesses
By Victor J. Evans
Attorney

UNITED STATES PATENT OFFICE.

CLAUDE R. KIEFER, OF MISHAWAKA, INDIANA.

BICYCLE.

1,109,424.   Specification of Letters Patent.   Patented Sept. 1, 1914.

Application filed April 11, 1914. Serial No. 831,220.

*To all whom it may concern:*

Be it known that I, CLAUDE R. KIEFER, a citizen of the United States, residing at Mishawaka, in the county of St. Joseph and State of Indiana, have invented new and useful Improvements in Bicycles, of which the following is a specification.

This invention relates to bicycles, the object in view being to produce a child's bicycle embodying a cheap and novel construction of frame including an extensible seat support forming a part of the frame and enabling the machine to carry one, two or more passengers as may be required, the machine being also constructed to represent a motor and tank to make the whole resemble a motorcycle.

With the above and other objects in view, the invention consists in the novel construction, combination and arrangement of parts, as will hereinafter be more fully described, illustrated and claimed.

Figure 1:
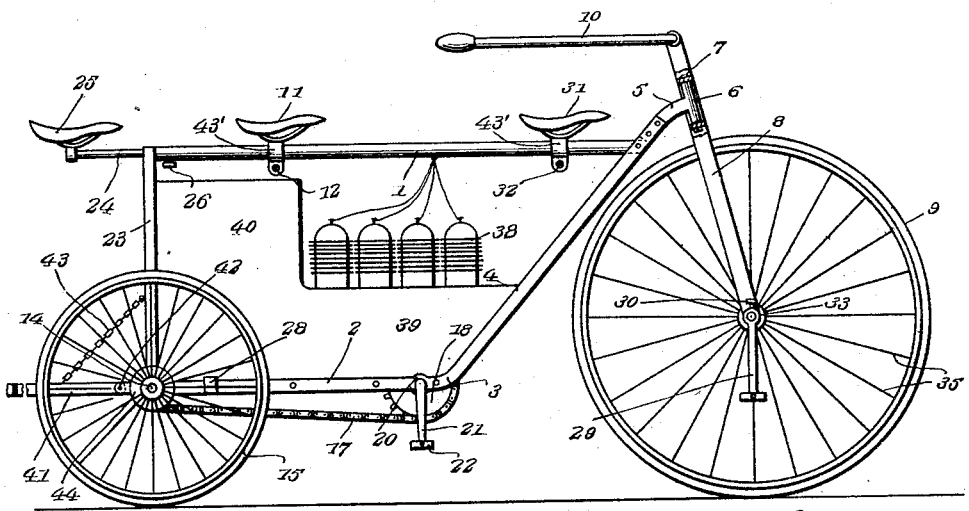
Figure 2:
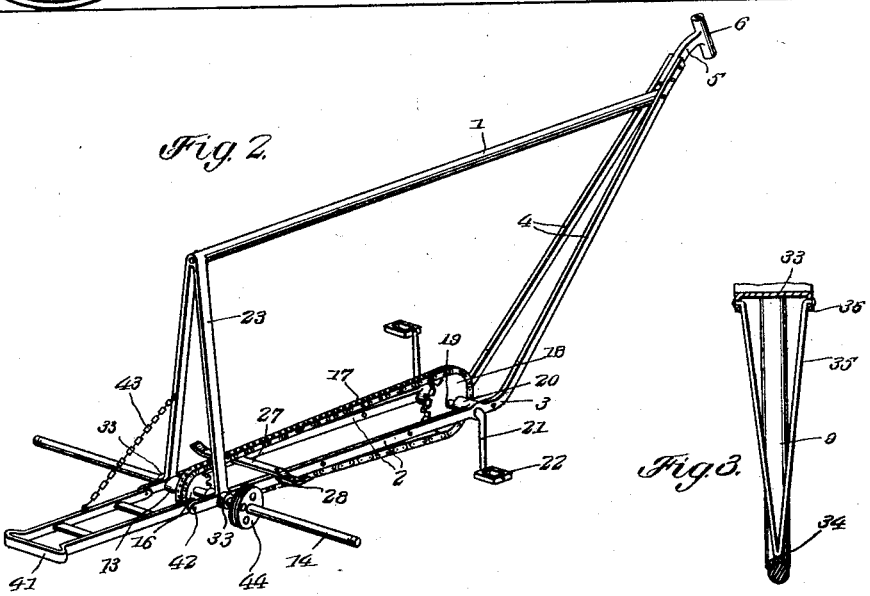
Figure 3:
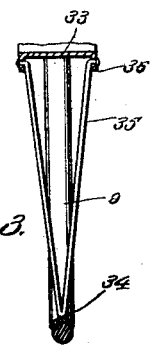

In the accompanying drawings:—Figure 1 is a side elevation of a bicycle embodying the present invention. Fig. 2 is a perspective view of the frame, showing the driving mechanism and omitting the wheels. Fig. 3 is a fragmentary sectional view of one of the wheels.

The frame of the bicycle contemplated in this invention comprises a top run 1 which is substantially horizontal as shown, and a pair of bottom runs 2 which are spaced a suitable distance apart as shown, the forward ends of the bottom runs being bent upwardly at 3 to form the upwardly inclined forward portions 4 which are connected to the shank 5 of a head tube 6 which receives a bolt 7 through which the frame is pivotally connected to the front fork 8 in which the front or steering wheel 9 is carried in the usual manner. A handle bar 10 of ordinary construction is connected to the head of the front fork 8 to enable the operator to steer the machine, 11 designating the operator's seat which is adjustable along the top run 1 by means of a combined screw 12 or its equivalent.

The rear extremities of the parallel bottom runs 2 are provided with bearings 13 for a rotary rear driving axle 14 on which the rear driving wheels 15 are fastened. The rear axle 14 also has fast thereon a sprocket wheel 16 from which a sprocket chain 17 extends forwardly around a driving sprocket wheel 18 on the crank shaft 19. This crank shaft is journaled in bearings 20 on the parallel bottom runs 2 and is provided with the usual cranks 21 and pedals 22. The rear end of the top run 1 is supported relatively to the rear axle 14 by means of downwardly diverging fork arms 23 the lower extremities of which are shown as connected to the rear bearings 13.

24 designates an extension seat bar which carries a second or auxiliary seat 25 for a passenger who rides in rear of the operator of the machine. The extension seat bar 24 is telescopically or slidably fitted in the rear end portion of the top run 5 so that the seat 25 may be adjusted to any desired extent in rear of the driver's seat 11 and may be fixed in such position when adjusted by means of a binding screw 26 or the equivalent thereof. The parallel horizontal bottom runs 2 form an excellent support for an internal combustion motor by means of which the sprocket chain 17 may be driven in lieu of the crank shaft 19 referred to.

27 designates a cross bar fastened to the parallel bottom runs 2 and having its end portions dished to form foot rests 28 for the rearmost rider who occupies the auxiliary saddle 25. If desired, operating cranks 29 may be fastened on the rotary axle of the front wheel 9 by means of set screws 30. Where the cranks 29 are employed, another saddle 31 will be mounted upon the top run 1 and held in place by means of a clamping screw 32.

In the preferred embodiment of the invention, each of the wheels is constructed to comprise a hub 33, a rim 34 and spokes 35 secured at their inner ends to flanges 36 at opposite ends of the hub, the spokes 35 converging from the hub outward where they are connected to the rim 34.

In order to make the machine more attractive to children, an engine 38 is placed in the frame of the machine, the same including a base 39 and a rear extension 40 to represent a gasolene tank. The parts 38, 39 and 40 will ordinarily be pressed out of sheet metal and are merely intended as a representation for the essential parts of an engine.

41 designates a combined carrier and rest which is pivotally connected at 42 to rear extensions of the bottom runs 2 so that said carrier and rest may be moved either to a horizontal position as shown in Fig. 1 where it may be sustained by a stay chain 43 or to a substantially vertical position where it will act as a rest and hold the rear wheels 15 clear of the ground.

The seats 11 and 31 are rendered detachable from the top run 1 by means of the U-shaped clips 43' which are adapted to straddle and pass over the top run being held securely in place when adjusted by means of the bolts 12 and 32.

A band pulley 44 is provided on the rear axle 14, the same being of the grooved type to receive a driving belt or band which may be used to operate any toy while the bicycle is at rest and supported upon the combined carrier and rest 41, thus adding to the utility and attractiveness of the toy bicycle.

It is to be understood that the pulley 44 is operated by the same driving mechanism including the cranks 21 and pedals 22 as used in propelling the machine.

What I claim is:—

1. In a bicycle, a frame embodying a top run, parallel bottom runs in spaced relation to each other and having their forward portions deflected upwardly and connected to the forward extremity of the top run, a rear fork extending from the top run downwardly to the rear extremities of the bottom runs, rear axle bearings at the points of junction of the bottom runs and rear fork, a rotary driving axle journaled in said bearings, driving wheels fast on the opposite ends of said axle, a crank shaft, sprocket wheels on said crank shaft and rear driving axle, and a sprocket chain running around said sprocket wheels.

2. A bicycle embodying a frame comprising a tubular horizontal top run, a driver's seat adjustable lengthwise of said top run, an extension seat bar telescopically fitted in said top run, means for fixing the adjustment of said seat bar, and an auxiliary seat carried by said extension seat bar.

In testimony whereof I affix my signature in presence of two witnesses.

CLAUDE R. KIEFER.

Witnesses:
 FLOYD C. KIEFER,
 ROSA KIEFER.

---

Copies of this patent may be obtained for five cents each, by addressing the "Commissioner of Patents, Washington, D. C."